(12) United States Patent
Wey

(10) Patent No.: US 11,692,808 B2
(45) Date of Patent: Jul. 4, 2023

(54) ROTATIONAL SPEED AND POSITION SENSOR ARRANGEMENT WITH TWO SENSORS AND AN AXIAL FACE DISC TARGET

(71) Applicant: Schaeffler Technologies AG & Co. KG, Herzogenaurach (DE)

(72) Inventor: Edward J. Wey, Waxhaw, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/337,623

(22) Filed: Jun. 3, 2021

(65) Prior Publication Data

US 2022/0390223 A1  Dec. 8, 2022

(51) Int. Cl.
| | |
|---|---|
| *G01D 5/14* | (2006.01) |
| *G01B 7/30* | (2006.01) |
| *G01P 3/44* | (2006.01) |
| *B60K 6/26* | (2007.10) |

(52) U.S. Cl.
CPC ............... *G01B 7/30* (2013.01); *G01D 5/14* (2013.01); *G01P 3/44* (2013.01); *B60K 6/26* (2013.01); *B60Y 2200/92* (2013.01); *B60Y 2400/303* (2013.01)

(58) Field of Classification Search
CPC . G01B 7/30; G01D 5/14; G01D 5/245; G01P 3/44
See application file for complete search history.

(56) References Cited

U.S. PATENT DOCUMENTS

| | | | |
|---|---|---|---|
| 6,036,370 A | 3/2000 | Kessen et al. | |
| 8,253,413 B2 * | 8/2012 | Hammerschmidt | G01R 33/095 324/207.25 |
| 9,389,098 B2 | 7/2016 | Hammerschmidt | |
| 9,810,519 B2 | 11/2017 | Taylor | |
| 2015/0176962 A1 * | 6/2015 | Kerdraon | G01D 5/145 324/207.24 |
| 2017/0314907 A1 * | 11/2017 | Taylor | G01R 33/06 |
| 2020/0041310 A1 | 2/2020 | Lassalle-Bailer et al. | |

* cited by examiner

*Primary Examiner* — Reena Aurora
(74) *Attorney, Agent, or Firm* — Volpe Koenig

(57) ABSTRACT

A rotational position sensor arrangement having first and second sensors positioned adjacent to an axial face of a target disc. The target disc has the axial face either one wave profile or radially spaced apart first and second wave profiles, having respectively, a first plurality of segments and a second plurality of segments, with each of the segments being formed with axially offset peaks and valleys which extend along radial lines. The valleys separate the segments, and the number of the first plurality of segments is different than the number of the second plurality of segments. The first and second sensors are located at different radial distances from the axis and signal a controller with data on a field variance due to a difference in at least one of a size or location of the one wave profile or the first and second wave profiles as they pass the first and second sensors in order to determine a rotational speed and/or position.

16 Claims, 7 Drawing Sheets

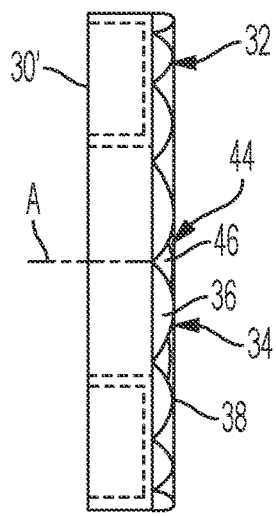
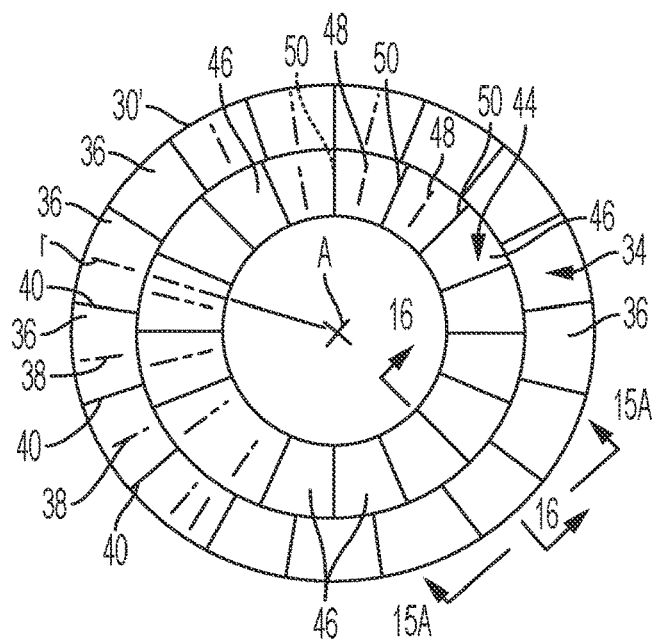
FIG. 14　　　　　FIG. 13
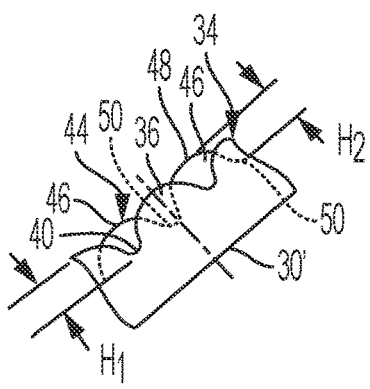
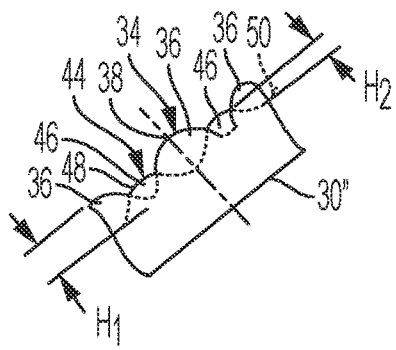
FIG. 15A　　　　　FIG. 15B
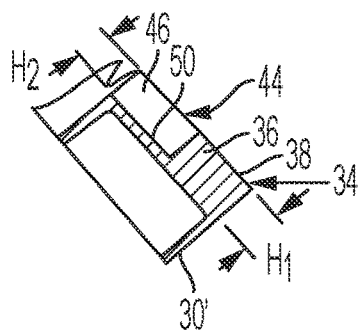
FIG. 16

ROTATIONAL SPEED AND POSITION SENSOR ARRANGEMENT WITH TWO SENSORS AND AN AXIAL FACE DISC TARGET

FIELD OF INVENTION

The present invention relates to a rotational speed and/or position sensor for a shaft, and in particular to a rotational speed and/or position sensor for a shaft or a bearing ring that supports a shaft. One preferred use is a speed and/or rotational position sensor for an e-motor of a hybrid drive.

BACKGROUND

Rotational speed and/or position sensors are known in many applications. One application of particular interest is for use in electric drive units for electric and hybrid-electric vehicles. Here, the vehicle control unit must know the rotational position of the electric motor shaft, even at rest before the motor begins to rotate, as well as during rotation.

Resolver type sensors have been known for use in monitoring the rotational position of motor shafts for vehicles that have an electric motor. These sensors have proven to be robust, but they are also relatively high in cost.

Sensors that utilize a magnetic ring or "mag rings" for a target are a more cost-effective solution that can sometimes be used. However, such sensors have the disadvantage that the magnetic ring can attract and conglomerate iron particles that come from wear of certain parts, and these particles may eventually break free and contaminate an associated bearing in a more concentrated manner than with the normal lubrication flow.

Other proposed solutions use a target sensor wheel connected to a shaft having a wave profile on a radially outer surface, such as in U.S. Pat. No. 6,036,370. However, the accuracy provided by this type of single target disc is limited, and for higher accuracy rotational angle and/or position measurement, additional axial space is required.

Other known rotational position sensors have used targets with a variety of profiles (wave, square tooth, "window" (similar to a needle bearing cage), etc.) for many years. The combinations of these types of sensors/targets have generally been used to monitor the speed and direction of the shaft. However, using this type of "low tech" approach to accurately monitor the actual rotational position of an electric motor for vehicle drive applications at any given time has proved challenging, particularly where axial space is at a premium, such as in vehicle drive systems.

SUMMARY

In one aspect, a rotational position sensor arrangement is provided that can be used to detect a precise rotational position. The arrangement includes first and second sensors, and a target disc having a rotation axis and being formed of a metallic material. The target disc has a first axial face with a first wave profile located at a first radial distance from the axis and a second wave profile located at a second radial distance from the axis that is different from the first radial distance. The first wave profile includes a first plurality of segments, each having a first axially offset peak located on a radial line extending from the axis and first valleys located along radial lines extending from the axis on each side of the first peak. The first valleys define boundaries between the first plurality of segments. The second wave profile includes a second plurality of segments, different from a number of the first plurality of segments, each having a second axially offset peak located on a radial line extending from the axis and second valleys located along radial lines extending from the axis on each side of the second peak. The second valleys define boundaries between the second plurality of segments. The first sensor is located adjacent to the first axial face in an area of the first radial distance from the axis, and the second sensor is located adjacent to the first axial face in an area of the second radial distance from the axis. A controller is connected to the first and second sensors. The controller is configured to provide a rotational position of the target disc based on the respective first and second wave profiles altering a magnetic field of each of the first and second sensors such that out-of-phase signals are provided to the controller. The first and second sensors can be inductive sensors, Hall effect sensors, TMR (Tunnel Magneto Resistance) sensors, or any other suitable sensor that detects a change in a magnetic field based on a metallic target being in the field.

In one embodiment, the first and second sensors are offset in a circumferential direction. In another embodiment, the first and second sensors are aligned in a circumferential direction.

In one embodiment, the axially offset first peaks of each of the first plurality of segments have a first axial height above the first valleys, and the axially offset second peaks of each of the second plurality of segments have a second axial height above the second valleys. The first axial height and the second axial height can be equal or different, which can be used to provide further differentiation between the signals and or different signal characteristics. It is also possible to vary a height of the first peaks relative to one another and/or a height of the second peaks relative to one another in order to provide circumferential position markers within the first wave profile and/or the second wave profile. This can also be done by varying a chord length of one of the first and/or second plurality of segments.

In one arrangement, the controller is configured to read a first chord length between two adjacent ones of the respective first valleys based on the signals from the first sensor, and the controller is further configured to read a second chord length between two adjacent ones of the respective second valleys based on signals from the second sensor. These chord lengths and their relative positions are then used to determine the rotational position of the target disc.

The controller may also be configured to determine a speed and direction of rotation of the target disc based on the different signals provided by the first and second sensors.

In another aspect, a method of detecting a rotational angle position of at least one of a shaft or bearing ring using the rotational position sensor described herein is provided. The method includes providing at least one of a shaft or bearing ring, and connecting the target disc to the at least one of the shaft or bearing ring. The first and second sensors are located adjacent to the first axial face of the target disc, and a rotational angle position of the at least one shaft or bearing ring is detected based on a field variance detected by the first and second sensors due to a difference in at least one of a size or location of the first and second wave profiles as they pass the first and second sensors.

The method can also include the controller determining a respective chord length between adjacent ones of the valleys in each of the first and second wave profiles, and the controller determining the rotational angle position of the at least one shaft or bearing ring based on a differential between the chord lengths and the relative positions.

In one preferred application, the method is for determining the rotational angle position for the shaft of an e-motor for a motor vehicle.

In another aspect, a rotational speed sensor arrangement is provided which includes first and second sensors and a target disc having a rotation axis and being formed of a metallic material. The target disk has a first axial face with a first wave profile located thereon, and the first wave profile includes a first plurality of segments, with each segment having a first axially offset peak located on a radial line extending from the axis and first valleys located along radial lines extending from the axis on each side of the first peak. The first valleys define boundaries between the first plurality of segments. The first sensor is located adjacent to the first axial face at a first radial distance from the axis and the second sensor is located adjacent to the first axial face at a second radial distance from the axis that is different than the first radial distance. A controller connected to the first and second sensors that is configured to provide a rotational speed of the target disc based on the first wave profile altering a magnetic field of each of the first and second sensors to provide signals to the controller.

In one embodiment, a zero marker is formed by an enlarged valley or peak on the target disc. This allows position sensing based on the zero marker location being detected.

In one arrangement, the first and second sensors are offset in a circumferential direction. Alternatively, they can be aligned in the circumferential direction.

Additionally, by forming the wave profile onto the axial face of the disc, the sensors can read the chord length that is created by two adjacent valleys. Positioning the second sensor at a different radial distance means the second sensor reads a chord length that is different than the chord length read at the position of the first sensor. The position as well as a differential between the two readings allows the speed, position and direction of rotation of the shaft to be determined.

In both cases, by utilizing a single target disc with one or more wave shapes formed onto the axial face, the overall sensor arrangement can be made with a shorter axial length with two or possibly more sensors positioned adjacent to the axial face as opposed to the outer diameter of the target. This results in less overall axial packaging requirements.

It is also possible to increase the accuracy and precision of the rotational position measurements by utilizing three or more sensors.

BRIEF DESCRIPTION OF THE DRAWINGS

The foregoing Summary and the following detailed description will be better understood when read in conjunction with the appended drawings, which illustrate a preferred embodiment of the invention. In the drawings:

FIG. 13 is a view of a first axial face of a target disc for a rotational position sensor arrangement in accordance with another embodiment.

FIG. 14 is a side view of the target disc of FIG. 13.

FIG. 15A is a view taken along lines 15A-15A in FIG. 13.

FIG. 15B is an alternative arrangement of the target disc used for the rotational position sensor arrangement similar to FIG. 15A.

FIG. 16 is a cross-sectional view taken along line 16-16 in FIG. 13.

DETAILED DESCRIPTION

Figure 2:
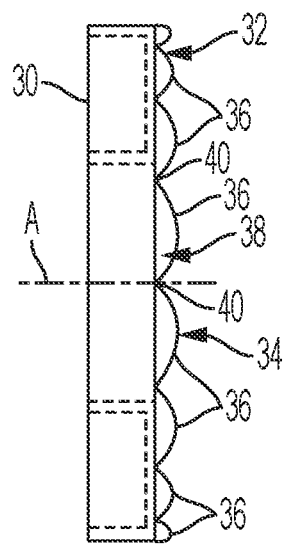
FIG. 2 is a side elevational view of the target disc shown in FIG. 1.
Figure 1:
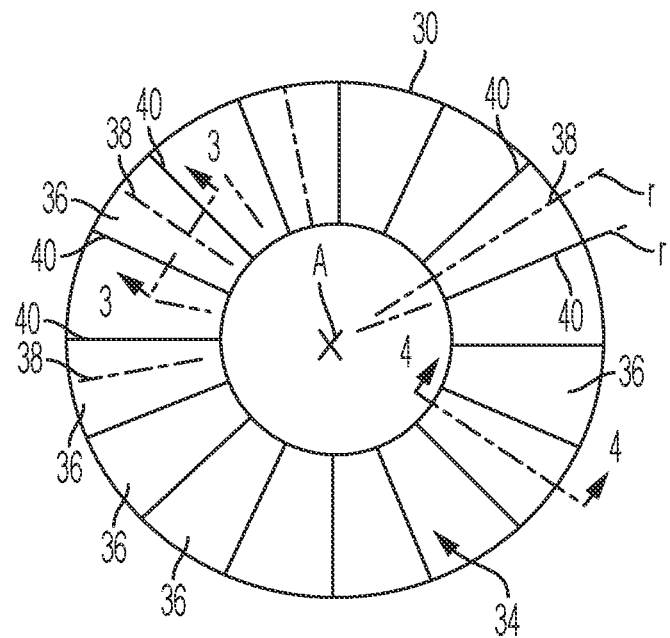
FIG. 1 is a view of a first axial face of a target disc used in connection with a rotational speed sensor arrangement according to one embodiment.

Certain terminology is used in the following description for convenience only and is not limiting. The words "inwardly" and "outwardly" refer to directions toward and away from the parts referenced in the drawings. "Axially" refers to a direction along the axis of a shaft. "Radially" refers to a direction normal to an axis. A reference to a list of items that are cited as, for example, "at least one of a or b" (where a and b represent the items being listed) means any single one of the items a or b, or a combination of a and b thereof. This would also apply to lists of three or more items in like manner so that individual ones of the items or combinations thereof are included. The terms "about" and "approximately" encompass + or −10% of an indicated value unless otherwise noted. The terminology includes the words specifically noted above, derivatives thereof and words of similar import.

Figure 3:
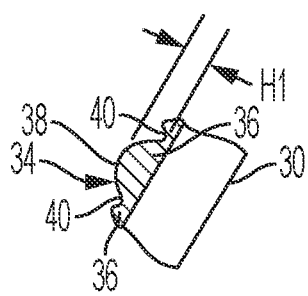
FIG. 3 is a cross-sectional view taken along line 3-3 in FIG. 1.
Figure 4:
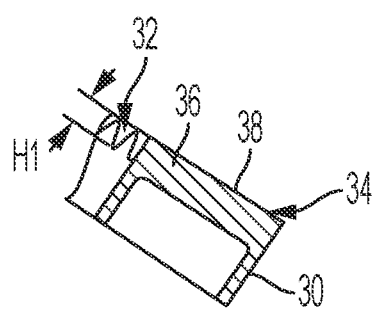
FIG. 4 is a cross-section view taken along line 4-4 in FIG. 1.
Figure 6:
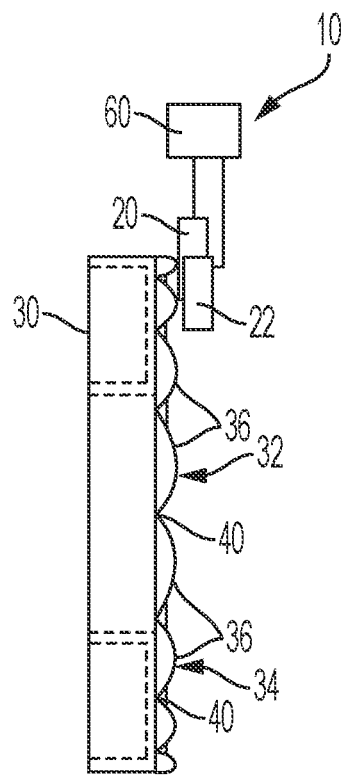
FIG. 6 is a side view of the rotational position sensor arrangement of FIG. 5.
Figure 5:
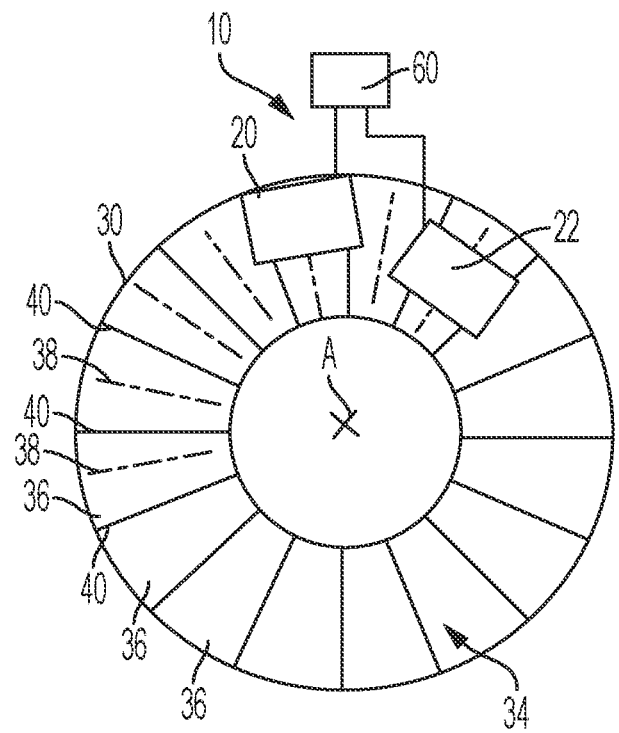
FIG. 5 is a view looking at the first axial face of the target disc which is assembled to form a rotational position sensor arrangement.
Figure 7:
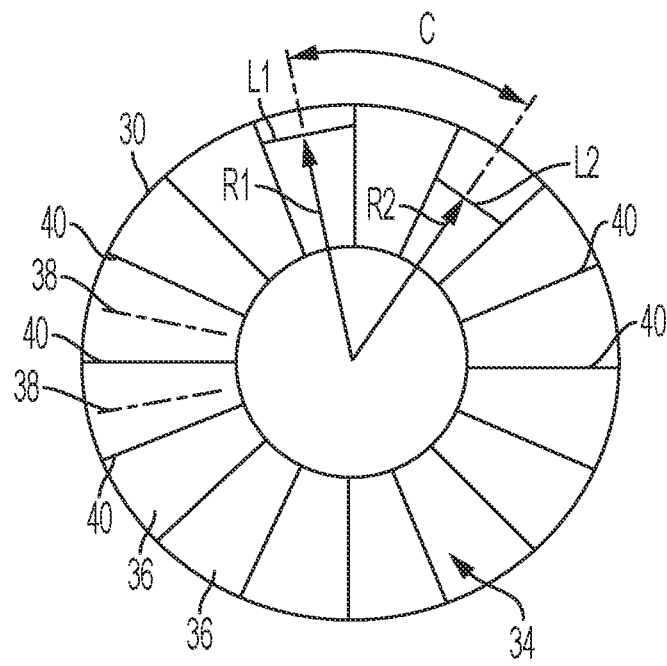
FIG. 7 is a view similar to FIG. 5 showing the chord lengths at the two sensor positions.

Referring to FIGS. 1-7, a rotational speed sensor arrangement 10 is shown, with FIGS. 1-4 showing details of the target disc 30 and FIGS. 5-7 showing the rotational speed sensor arrangement 10 which includes first and second sensors 20, 22 located adjacent to a first axial face 32 of the target disc 30.

Referring to FIGS. 1-4, the target disc 30 includes a first wave profile 34 on the first axial face 32. The first wave profile 34 includes a first plurality of segments 36, which in this case are truncated pie-shape segments, each having a first axially offset peak, indicated at 38 for some of the segments 36 shown in FIGS. 1 and 3, with it being understood that each of the segments includes an axial peak 38. The axially offset peaks 38 are located on radial lines r that extend from the axis A of the target disc 30. First valleys 40 are located along radial lines r extending from the axis A on each side of the first peaks 38. These first valleys 40 define boundaries between the first plurality of segments 36.

The target disc is formed of a metallic material and, as shown in detail in FIGS. 3 and 4, the first plurality of segments 36 define a series of axially offset peaks 38 separated by the first valleys 40. These can be in a sine-wave or modified sine-wave configuration.

Referring now to FIGS. 5-7, the details of the rotational speed sensor arrangement 10 will be further explained. As shown in FIGS. 5 and 6, the first and second sensors 20, 22 are located adjacent to the first axial face 32 of the target disc 30. Here, the first sensor 20 is located at a first radial distance R1 from the axis A, and the second sensor 22 is located adjacent to the first axial face 32 at a second radial distance R2 from the axis A that is different from the first axial distance R1. Here, the second radial distance R2 is less than R1. In this embodiment, the first and second sensors 20, 22 are offset in a circumferential direction C as indicated in FIG. 7. However, the first and second sensors 22 are "in-phase" in that they are both aligned in the same position with respect to a first axial offset peak 38 of respective ones of the segments 36 which are circumferentially spaced from one other.

The controller 60 is connected to the first and second sensors 20, 22 and is configured to provide a rotational speed of the target disc 32 based on the first wave profile 34 altering a magnetic field of each of the first and second sensors to provide signals to the controller 60. The first axially offset peaks 38 of the first plurality of segments 36 affect the magnetic field generated by the first and second sensors 20, 22 as the target disc 30 is rotated, and based on this, different signals are captured at the different radial distance R1, R2 where the first and second sensors 20, 22 are located. The controller uses the signals from the first and second sensors 20, 22 to calculate the speed with which the target disc 30 is rotating with high precision.

In one arrangement, the sensors 20, 22 can read the chord length, indicated as L1 and L2 in FIG. 7 at the different radial positions R1 and R2, and based on the different timing that the specific chord lengths are read due to the difference in the radial distances R1 and R2, a differential between these readings is used by the controller 60 to calculate the rotational speed.

Figure 9:
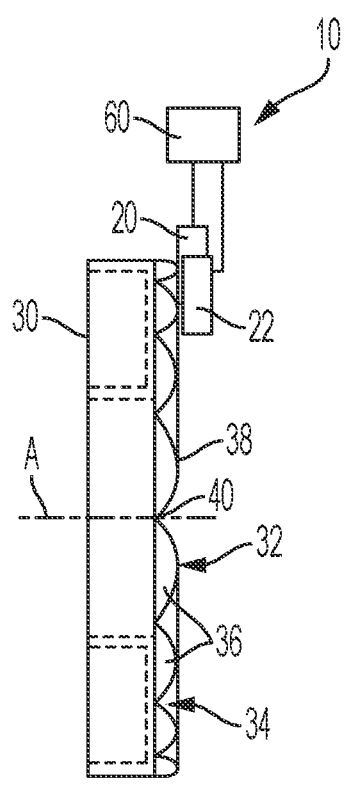
FIG. 9 is a side elevational view of the rotational speed sensor arrangement shown in FIG. 8.
Figure 8:
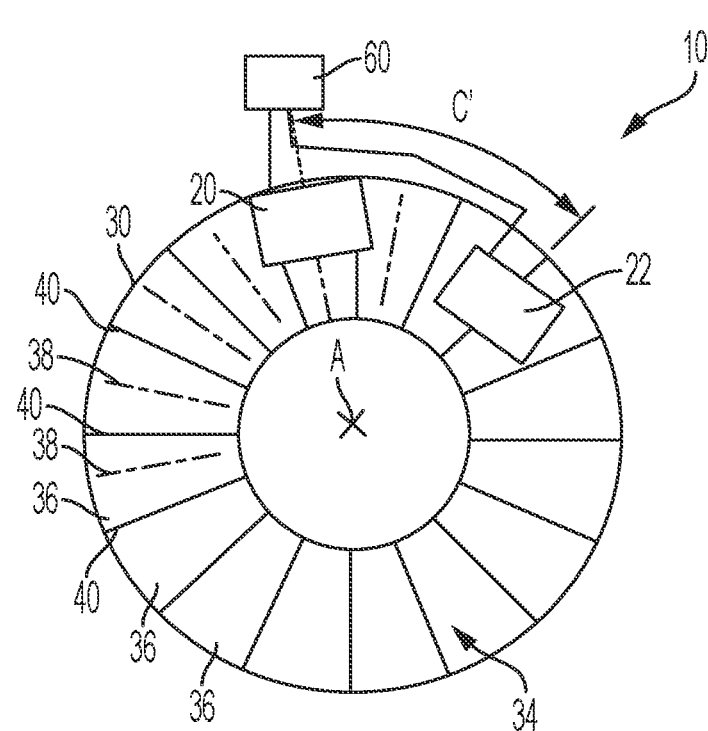
FIG. 8 is a view of another embodiment of a rotational speed sensor arrangement similar to FIG. 5 in which the first and second sensors are located out of phase.

Referring to FIGS. 8 and 9, a further embodiment of the rotational speed sensor arrangement 10 is shown. In this embodiment, the first and second sensors 20, 22 are offset in the circumferential direction by a distance C' which in this case moves the first and second sensors 20, 22, "out-of-phase" from one another. In this case, as seen from FIG. 8, the first sensor 20 is aligned over a first axially offset peak 38 of one of the first plurality of segments 36 while at the same rotational position target disc 30, the second sensor 22 is located over a valley 40 between two adjacent ones of the first plurality of segments 36. This provides a different overlap profile for the signal generated by each of the first and second sensors 20, 22 in order to provide further accuracy and allow the controller 60 to more easily filter out noise or interference generated by the sensors 20, 22, being located adjacent to one another.

Figure 11:
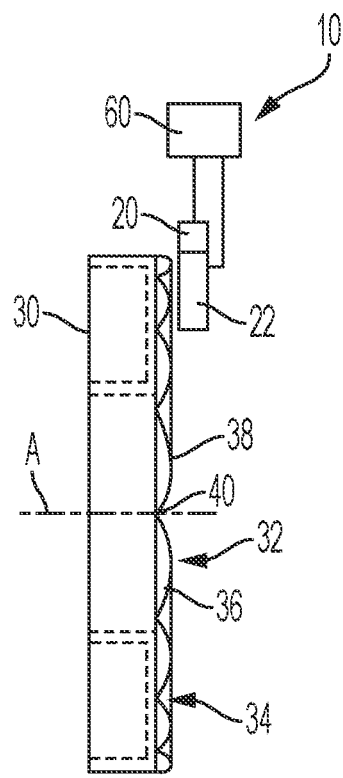
FIG. 11 is a side view of the rotational speed sensor arrangement of FIG. 10.
Figure 10:
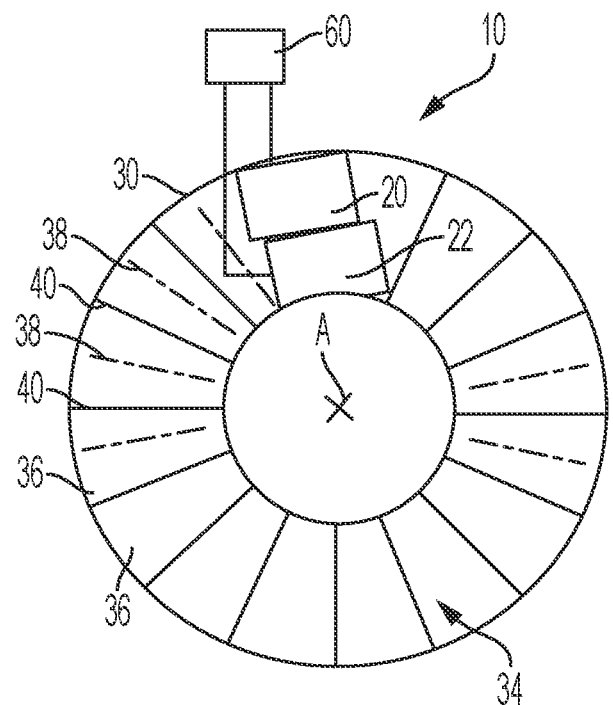
FIG. 10 is a view of another embodiment of a rotational speed sensor arrangement similar to FIG. 5 in which the sensors are arranged at a same circumferential position.

Referring to FIGS. 10 and 11, a third embodiment of the rotational speed sensor arrangement 10 is shown. This arrangement is also similar to the embodiment shown in FIGS. 5-7 in that the first and second sensors 20, 22 are located "in-phase" with one another. However, in this case they are located at the same circumferential position as shown in FIG. 10.

Figure 12:
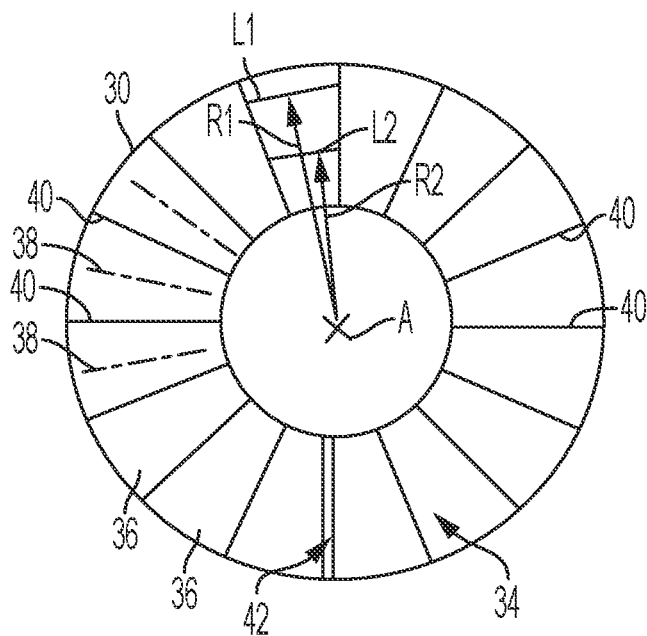
FIG. 12 is a view of a further embodiment of the rotational speed sensor arrangement shown in FIG. 10 which further includes a zero marker in order to further allow rotational position sensing.

Referring to FIG. 12, a further embodiment of the rotational speed sensor arrangement 10 is provided with the target disc 30 in FIG. 12 including a zero marker 42 formed, for example, by an enlarged valley that has a different circumferential width or profile than the other valleys 40. This could also be accomplished with a segment 36 having a different shape or profile. In this case, the rotational speed sensor arrangement 10 using the target disc 30 as shown in FIG. 12 would also provide the ability to track a rotational position of the target disc 30 based on the zero marker 42 passing the first and second sensors 20, 22. In this case, the controller 60 tracks the position of the zero marker 42 for each rotation and then determines the rotational position based on the number of segments 36 of the first wave profile 34 that pass the aero marker 42. The target disc 30 of FIG. 12 could be used with the sensor arranged as shown in any of FIG. 5, 8, or 10.

Referring now to FIG. 13-19, a rotational position sensor arrangement 10' in accordance with a further embodiment of the invention is shown. FIGS. 13, 14, 15A, and 16 show a target disc 30' used in connection with the rotational position sensor arrangement 10' while the rotational position sensor arrangement 10' is shown in detail in FIGS. 17-19.

The rotational position sensor arrangement 10' includes the first and the second sensors 20, 22. However, the target disc 30' as shown in FIGS. 13, 14, 15A, and 16 includes the first axial face 32 with the first wave profile 34 located at a first radial distance R1 from the axis A as well as a second wave profile 44 located at a second radial distance R2 from the axis A that is different from the first radial distance R1. The first wave profile 34 includes a first plurality of segments 36, with each of the first segments 36 having a first axially offset peak 38 located on a radial line r extending from the axis A and first valleys 40 located along radial lines r extending from the axis A on each side of the first peak 38. The first valleys 40 define boundaries between each of the first plurality of segments 36.

Still referring to FIGS. 13, 14, 15A, and 16, the second wave profile 34 includes a second plurality of segments 46, having a number that is different from a number of the first plurality of segments 36, each of the second segments 46 having a second axially offset peak 48 located on a radial line r extending from the axis A. Second valleys 50 located along radial lines r extending from the axis A are located on each side of the second peaks 48. The second valleys 50 define boundaries between each of the second plurality of segments 46.

Each of the first plurality of segments 36 and the second plurality of segments 46 have a truncated pie-shape wedge appearance in the illustrated embodiment. However, other shapes are possible. The target disc 30' is formed of a metallic material. In the embodiment of target disc 30' shown in FIG. 15A, the axially offset peaks 38 of each of the first plurality of the segments 36 have a first axial height H1 above the first valleys 40. The axially offset peaks 48 of each of the second plurality of segments 46 have a second axial height H2 above the second valleys. In this arrangement, the first axial height H1 and the second axial height H2 are equal. Alternatively, as shown in FIG. 15B, the target disc 30' could have the first axial height H1 and the second axial height H2 different. In FIG. 15B, the second axial height H2 is less than the first axial height H1. While the valleys 40, 50 are shown at a same axial height, this could also be varied so that the first valleys are locate in one plane and the second valleys 50 are located in a different plane that is axially offset from the plane with the first valleys 40.

Figure 18:
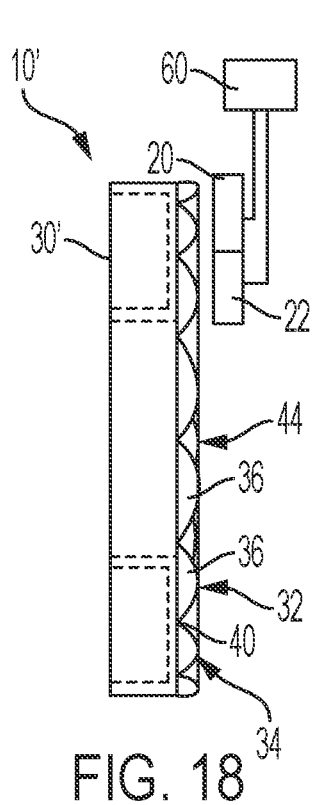
FIG. 18 is a side view of the rotational position sensor arrangement shown in FIG. 17.
Figure 17:
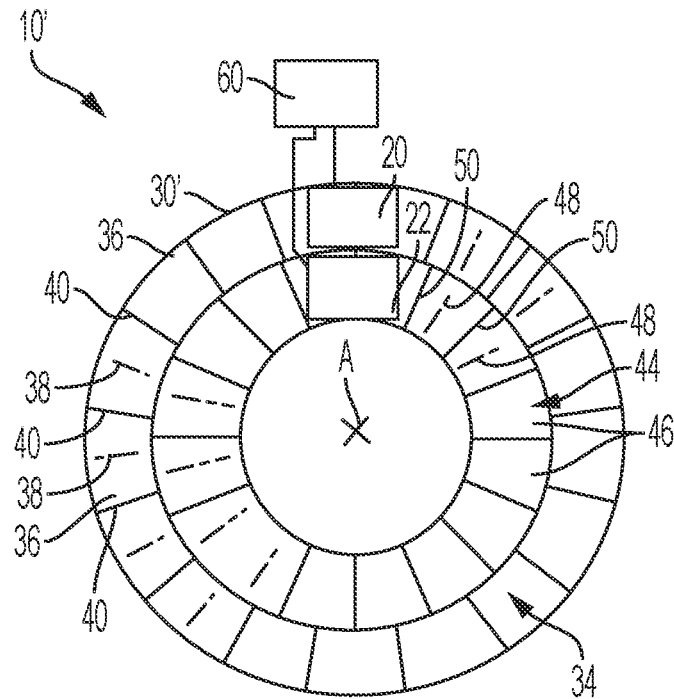
FIG. 17 is a view looking in the axial direction of a rotational position sensor arrangement include the target disc shown in FIG. 14.
Figure 19:
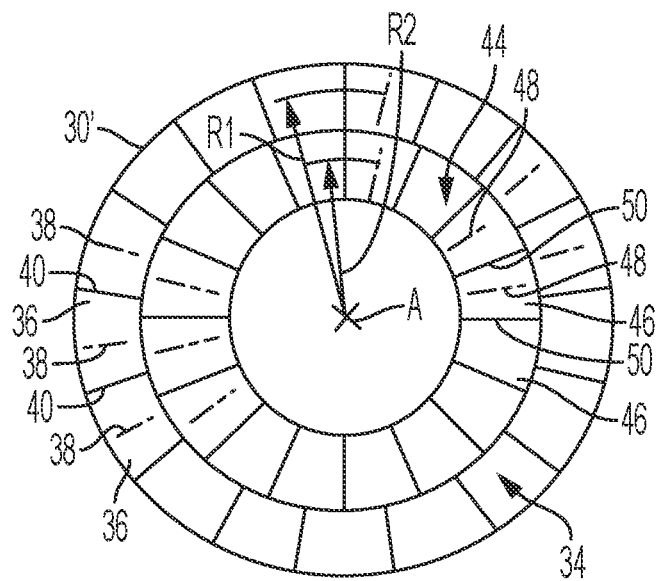
FIG. 19 is a view of the target disc for the rotational position sensor arrangement in FIGS. 17 and 18 showing the radial position of the first and second sensors.

As shown in FIGS. 17-19, the first sensor 20 is located adjacent to the first axial face 32 in an area of the first radial distance R1 so that it is generally aligned with the first plurality of segments 36. The second sensor 22 is located adjacent to the first axial face 32 in an area of the second radial distance R2 so that it is generally aligned with the second plurality of segments 46.

The controller 60 is connected to the first and second sensors 20, 22 and is configured to provide a rotational position of the target disc 30' based on the first and second wave profiles 34, 44 altering a magnetic field of each of the first and second sensors 20, 22, respectively, in order to provide out-of-phase signals to the controller based on the different number of the first plurality of segments 36 from the second plurality of segments 46.

While the first and second sensors 20, 22 are shown in an aligned circumferential position in FIG. 17, the first and second sensors could be arranged offset in the circumferential direction as shown for example in FIG. 5 or 8.

Based on the differential between the signals produced by the first and second sensors 20, 22 based on the different number and circumferential spacing of the respective first and second plurality of segments 36, 46, the exact rotational position of the target disc 30' can be determined at any location, even starting from a standstill position of the target disc 30'. The sensitivity of the rotational position can be enhanced by providing a greater number of the first plurality of segments 36 and second plurality of segments 46. In one embodiment, the number of the first plurality of segments can be at least 10, and more preferably at least 17, and possibly 37 or more. The number of the second plurality of segments 46 is in each case preferably one less than the number of the first plurality of segments 36. Additionally, providing a further plurality of segments along with another sensor (not shown) would provide further gradation in order to enhance position sensing.

The controller 60 can be configured to read a first chord length L1 between two adjacent ones of the respective first valleys 40 based on signals from the first sensor 20 and can be further configured to read a second chord length L2 between two adjacent ones of the respective second valleys 50 based on signals from the second sensor 22. Based on the chord lengths L1, L2 as well as their relative positions, a position of the target disc 30' is calculated.

Using the rotational position sensor arrangement 10', the controller 60 can be further configured to determine both a speed and direction of rotation of the target disc 30' based on the frequency of the oscillating signals produced by at least one of the first or second sensors 20, 22 as well as the phase differentiation provided by the different number of the first plurality of segments 36 from the second plurality of segments 46.

Figure 20:
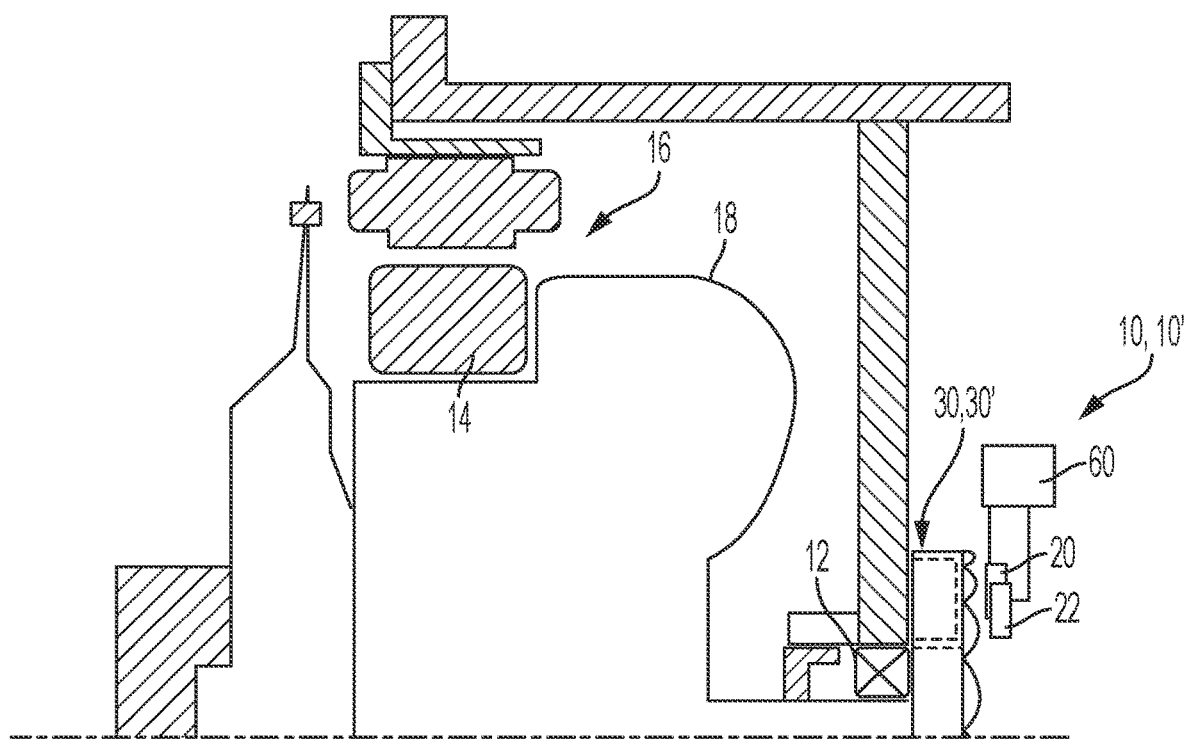
FIG. 20 is a schematic view showing the rotational position sensor arrangement being used in connection with an E-motor of a motor vehicle.

Referring to FIG. 20, one preferred application of the rotational speed sensor arrangement 10 or the rotational position sensor arrangement 10' is shown. Here, the target disc 30, 30' is connected to the rotor 14 of an E-motor 16 for a motor vehicle. In this arrangement, the rotor 14 is connected to the torque converter 18 which has the output end supported via a bearing 12. The target disc 30, 30' can be connected to the bearing 12 or otherwise engaged with the shaft connected to the output flange of the torque converter 18. The rotational speed sensor arrangement 10 or the rotational position arrangement 10' can be used to provide speed and/or position data of the rotor 14 which is required for use in connection with the vehicle controller, for example, to control the start and stopping of the E-motor 16.

The present speed and position sensor arrangements 10, 10' allow for reduced manufacturing cost and less axial packaging space while at the same time providing a robust sensor at a reduced cost in comparison to other known sensors.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

LIST OF REFERENCE NUMERALS

10 Sensor arrangement
12 Bearing
14 Rotor
16 E-motor
20 First sensor
22 Second sensor
30, 30' Target disc
32 First axial face
34 First wave profile
36 First plurality of segments
38 First axially offset peak(s)
40 First valleys
44 Second wave profile
46 Second plurality of segments
48 Second axially offset peak(s)
50 Second valleys
60 Controller
A Axis
R1 Radial distance
R2 Second radial distance
r Radial line
C Circumferential direction
C' Circumferential distance
H1 Axial height
H2 Second axial height
L1, L2 Chord length

What is claimed is:

1. A rotational position sensor arrangement, comprising:
first and second sensors;
a target disc having a rotation axis and being formed of a metallic material, the target disk having a first axial face with a first wave profile located at a first radial distance from the axis and a second wave profile located at a second radial distance from the axis that is different from the first radial distance, the first wave profile including a first plurality of segments, each having a first axially offset peak located on a radial line extending from the axis and first valleys located along radial lines extending from the axis on each side of the first peak, the first valleys define boundaries between the first plurality of segments, and the second wave profile including a second plurality of segments, different from a number of the first plurality of segments, each having a second axially offset peak located on a radial line extending from the axis and second valleys located along radial lines extending from the axis on each side of the second peak, the second valleys define boundaries between the second plurality of segments;

wherein the first sensor is located adjacent to the first axial face in an area of the first radial distance from the axis and the second sensor is located adjacent to the first axial face in an area of the second radial distance from the axis, and a controller connected to the first and second sensors that is configured to provide a rotational position of the target disc based on the respective first and second wave profiles altering a magnetic field of each of the first and second sensors that provide out-of-phase signals to the controller.

2. The rotational position sensor arrangement of claim 1, wherein the first and second sensors are offset in a circumferential direction.

3. The rotational position sensor arrangement of claim 1, wherein the first and second sensors are aligned in a circumferential direction.

4. The rotational position sensor arrangement of claim 1, wherein the axially offset first peaks of each of the first plurality of segments have a first axial height above the first valleys.

5. The rotational position sensor arrangement of claim 4, wherein the axially offset second peaks of each of the second plurality of segments have a second axial height above the second valleys.

6. The rotational position sensor arrangement of claim 5, wherein the first axial height and the second axial height are equal.

7. The rotational position sensor arrangement of claim 5, wherein the first axial height and the second axial height are different.

8. The rotational position sensor arrangement of claim 1, wherein the controller is configured to read a first chord length between two adjacent ones of the respective first valleys based on the signals from the first sensor, and the controller is further configured to read a second chord length between two adjacent ones of the respective second valleys based on signals from the second sensor.

9. The rotational position sensor of claim 1, wherein the controller is further configured to determine a speed and direction of rotation of the target disc.

10. A method of detecting a rotational angle position of at least one shaft or bearing ring using the rotational position sensor arrangement of claim 1, the method comprising:
providing at least one shaft or bearing ring,
connecting the target disc to the at least one shaft or bearing ring,
aligning the first and second sensors adjacent to the first axial face; and
detecting a rotational angle position of the at least one shaft or bearing ring based on a field variance due to a difference in at least one of a size or location of the first and second wave profiles as they pass the first and second sensors.

11. The method of claim 10, further comprising:
the controller determining a respective chord length between adjacent ones of the valleys in each of the first and second wave profiles; and
the controller determining the rotational angle position of the at least one shaft or bearing ring based on a differential between the chord lengths.

12. The method of claim 10, wherein the determining of the rotational angle position is for a rotor of an e-motor for a motor vehicle.

13. A rotational speed sensor arrangement, comprising:
first and second sensors;
a target disc having a rotation axis and being formed of a metallic material, the target disk having a first axial face with a first wave profile located at a first radial distance from the axis and a second wave profile located at a second radial distance from the axis that is different from the first radial distance, the first wave profile including a first plurality of segments, each having a first axially offset peak located on a radial line extending from the axis and first valleys located along radial lines extending from the axis on each side of the first peak, the first valleys define boundaries between the first plurality of segments, and the second wave profile including a second plurality of segments, different from a number of the first plurality of segments, each having a second axially offset peak located on a radial line extending from the axis and second valleys located along radial lines extending from the axis on each side of the second peak, the second valleys define boundaries between the second plurality of segments;
wherein the first sensor is located adjacent to the first axial face at a first radial distance from the axis and the second sensor is located adjacent to the first axial face at a second radial distance from the axis that is different than the first radial distance; and
a controller connected to the first and second sensors that is configured to provide a rotational speed of the target disc based on the first wave profile altering a magnetic field of each of the first and second sensors to provide position signals to the controller.

14. The rotational speed sensor arrangement of claim 13, further comprising a zero marker formed by an enlarged valley or an enlarged peak.

15. The rotational speed sensor arrangement of claim 13, wherein the first and second sensors are offset in a circumferential direction.

16. The rotational speed sensor arrangement of claim 13, wherein the first and second sensors are aligned in a circumferential direction.

* * * * *